United States Patent
Lee et al.

(10) Patent No.: US 6,945,103 B1
(45) Date of Patent: Sep. 20, 2005

(54) TIRE STATUS MONITORING SYSTEM

(75) Inventors: Gyu Cheol Lee, Anyang (KR); Hui Yeon Chae, Gwangmyeong (KR)

(73) Assignee: Seetron Inc., (KR)

( * ) Notice: Subject to any disclaimer, the term of this patent is extended or adjusted under 35 U.S.C. 154(b) by 0 days.

(21) Appl. No.: 10/832,121

(22) Filed: Apr. 26, 2004

(51) Int. Cl.⁷ .............................................. B60C 23/02
(52) U.S. Cl. .................................................. 73/146.5
(58) Field of Search ............................... 73/146, 146.4, 73/146.5, 708; 701/1, 29, 34, 36; 340/438–447

(56) References Cited

U.S. PATENT DOCUMENTS

| | | | |
|---|---|---|---|
| 5,900,543 A | 5/1999 | Oshiro | |
| 6,498,967 B1 * | 12/2002 | Hopkins et al. | 701/1 |
| 6,591,671 B2 * | 7/2003 | Brown | 73/146.5 |
| 6,662,642 B2 * | 12/2003 | Breed et al. | 73/146 |
| 6,705,152 B2 | 3/2004 | Routkevitch et al. | |

* cited by examiner

Primary Examiner—William Oen
(74) Attorney, Agent, or Firm—Keusey, Tutunjian & Bitetto, P.C.

(57) ABSTRACT

A tire status monitoring system monitors tire conditions, such as tire pressure, temperature, etc., thereby improving automobile safety. The tire status monitoring system provides transmitters, mounted within the vehicle tires, for transmitting tire conditions. A receiver is installed in the vehicle, for analyzing the tire condition data received from each transmitter. The transmitter includes a pressure sensor for sensing air pressure, a temperature sensor for sensing temperature in the tire; a drive detecting sensor for sensing driving velocity; a radio transmission module for modulating the input data into a radio frequency signal to transmit the modulated signal; and a control device for identifying the operation mode by the pressure, temperature and driving velocity input from the sensors in sensing mode. The control device controls the radio transmission module so that the sensed data can be transmitted at a predetermined period according to the identified operation mode.

8 Claims, 4 Drawing Sheets

TIRE STATUS MONITORING SYSTEM

BACKGROUND OF THE INVENTION

1. Field of the Invention

The present invention relates to a tire status monitoring system for monitoring tire conditions, such as tire air pressure and temperature, to improve the safety of vehicular operation, and more particularly to a tire status monitoring system capable of varying the transmission periods for transmitting tire condition data according to an operation mode to reduce consumption power of vehicle batteries.

2. Description of the Related Art

As traffic has increased, in order to improve the safety of automotive operation, a tire status monitoring system may be provided so that a driver inside the vehicle can recognize vehicular tire conditions, mainly tire air pressure. Methods of monitoring the tire air-pressure by such a tire status monitoring system are classified into the indirect detecting method where a rotation number of the vehicular wheel changes indicates a difference in tire air pressure (which is described in U.S. Pat. No. 5,900,543) and the direct detecting method of directly detecting the tire air pressure by installing a pressure sensor inside the tire (which is described in U.S. Pat. No. 6,705,152).

The indirect detecting method of using the change of rotation number of the vehicular wheel is economical in cost and requires less installation work. But, such method has problems in that the measuring error may be excessive so that it is easy for a warning signal error to occur, only a relative comparison of pressures to other readings is possible and any correction work of the equipment is complicated.

The system of directly measuring the tire air pressure by installing pressure sensors inside the tire comprises a transmitter which is installed in a tire to wirelessly transmit the tire condition and a receiver which is installed on a dashboard to inform a driver of the tire condition. Here, each transmitter is installed at the wheel in order to measure the air pressure within the tire, and because each transmitter is driven by a battery, the operation of the transmitter is stopped in the case where the battery is fully consumed or dead. In this case where the battery has been consumed, the tire must be separated from the wheel in order to exchange this battery. Therefore, there is a problem in that it is very difficult to exchange the battery. In addition, the transmitter is assembled with high precision to endure the rough conditions within the tire. Accordingly, there is another problem in that the opening of transmitter case for exchange of the battery may result in lowering the reliability of the transmitter.

SUMMARY OF THE INVENTION

The present invention has been proposed to solve the aforementioned problems, and it is accordingly an object of the present invention to provide a improved tire status monitoring system capable of lamely increasing a life of the battery for a transmitter by varying the transmission period for transmitting tire condition data in an operation mode after identifying the operation mode of vehicle.

In order to accomplish the aforementioned object, the present invention provides a tire status monitoring system comprising: a plurality of transmitters, mounted within the tires of vehicle, for transmitting tire condition data after detecting the tire condition; and a receiver, installed in the vehicle, for analyzing the tire condition data received from each transmitter thereby to display the tire condition, wherein the transmitter comprising: a pressure sensor for sensing an air pressure in the tire to provide a pressure data; a temperature sensor for sensing an air temperature in the tire to provide temperature data; a drive detecting sensor for sensing whether the vehicle is driven or not to provide driving velocity data; a radio transmission module for modulating the input data into a radio frequency signal to transmit the modulated signal; and a control means for identifying the operation mode by the pressure data, the temperature data and the driving velocity data inputted from the sensors in sensing mode and controlling the radio transmission module so that the sensed data can be transmitted at a predetermined period according to the identified operation mode, and the receiver comprising: a manipulating means; a radio reception module for receiving a radio signal to demodulate the received signal; a display; a buzzer; and a control means for setting a warning reference value for warning, provided that the driver selects the setting, and controlling, in a normal state, to receive the condition data of each tire through the radio reception module and decode the received data, and thereafter to compare the decoded data with the predetermined warning reference value so that warning is given by vibrating the buzzer or display the tire condition on the display.

BRIEF DESCRIPTION OF THE DRAWINGS

The above objects and various advantages of the present invention will be more clearly understood from the following detailed description of a preferred embodiment of the present invention with reference to the accompanying, wherein.

DESCRIPTION OF THE PREFERRED EMBODIMENTS

A preferred embodiment of the invention will be described below in detail with reference to the accompanying drawings.

Figure 1:
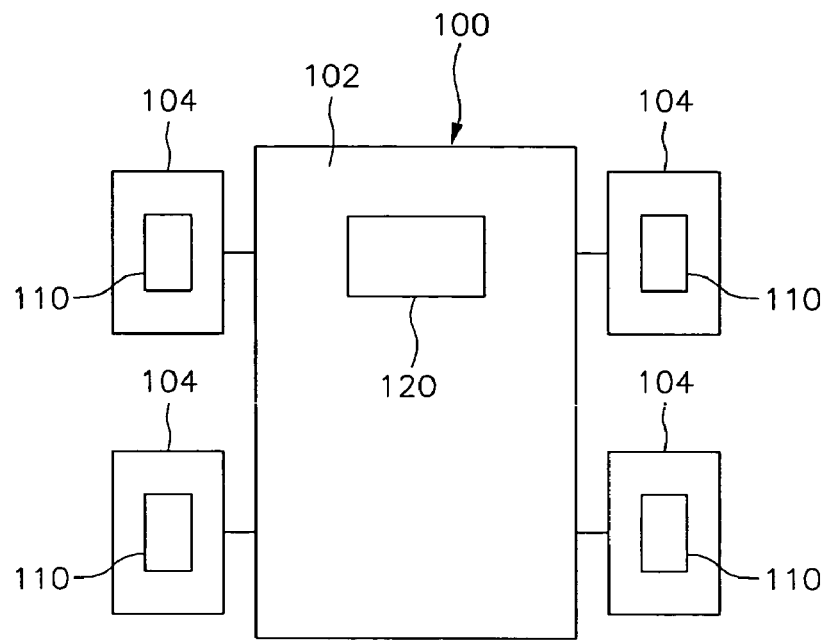
FIG. 1 is a schematic view illustrating the overall construction of an embodiment of a tire status monitoring system to which the present invention is applied.

FIG. 1 is an example of a vehicle in which a tire condition monitoring according to the present invention is adopted.

Referring to FIG. 1, a tire condition transmitter 120 for wirelessly transmitting each tire condition is installed in tires 104 of a vehicle 100 to which the present invention is applied, and (on a dashboard) near a driver's seat in the inside 102 of the vehicle. A tire condition receiver 120 for displaying the tire condition is installed. Each of transmitters 110 can be tied and mounted by a band to each central rim of wheels or can be installed together with an air injection valve, thereby to detect the air pressure in the tire. Also, in each of the transmitters 110 installed in each tire, each specified tire position information is predetermined so that they can be identified from each other, wherein, at the time of the first delivery, the tire position information and the tire positions are arranged according to a fixed rule as represented in Table 1, and at the time of exchanging the tires the relation of the tire position information and the actual position can be register in the receiver.

TABLE 1

| Actual position of tire | Rule of assigning the tire position information | Identification sign (color) |
| --- | --- | --- |
| The left of front wheel | Dividing by 4 with a remainder of 0 | Red color |
| The right of front wheel | Dividing by 4 with a remainder of 1 | Green color |
| The left of rear wheel | Dividing by 4 with a remainder of 2 | Purple color |
| The right of rear wheel | Dividing by 4 with a remainder of 3 | Yellow color |

As in the above Table 1, the tire condition transmitter 110 installed in the left tire of front wheel assigns itself in accordance with the relationship, which is divided by 4 without the remainder, as the tire position information corresponding to the left tire of front wheel, and then indicates a red color on a cover of the transmitter or the wheel in which the transmitter is attached. Also, the tire condition transmitter 110 installed in the right tire of front wheel assigns itself according the relationship in Table 1, which is divided by 4 with a remainder of 1, as the tire position information corresponding to the right tire of front wheel, and then indicates a green color on a cover of the transmitter or the wheel in which the transmitter is attached. In the same manner as in the aforementioned, the transmitter 110 assigns respectively the tire position information corresponding to each of the left tire and the right tire of rear wheels. Accordingly, the tire condition receiver 120 utilizes the condition information (i.e., pressure, temperature, voltage, etc.) and the tire position information received from each of tire condition transmitters 110 so that it can judge what condition the tire of any position is in. The above Table 1 is an only example representing the tire position information and in reality a variety of different methods can be used.

Figure 2:
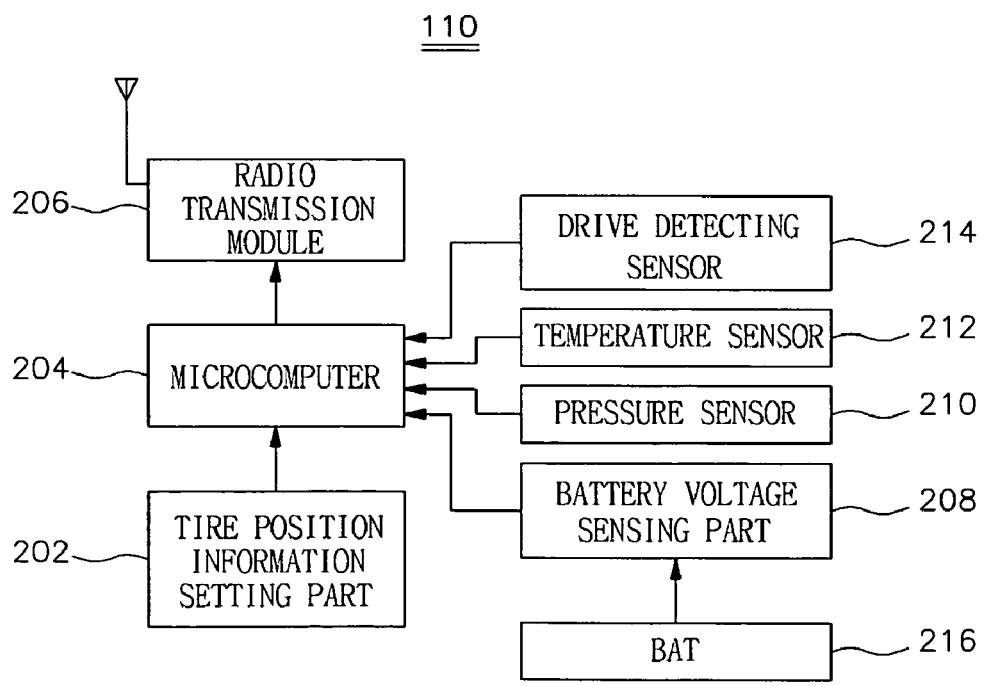
FIG. 2 is a block diagram showing a construction of a tire condition transmitter illustrated in FIG. 1.

A data format transmitted from the transmitters 110 to the receiver 120, comprises a header for synchronization, tire position information from the transmitter, pressure data, temperature data, and battery voltage data. Here, the header includes a synchronization signal for informing of the start of data transmission. Because 4 transmitters are needed for one vehicle, the tire position information identifiers from the transmitters and each detection data is represented by 8 bits. FIG. 2 is a block diagram showing a construction of a tire condition transmitter illustrated in FIG. 1.

Referring to FIG. 2, the tire condition transmitter 110 of the present invention comprises a tire position information setting part 202 for setting the tire position information, a microcomputer 204 for controlling the whole operation, a radio transmission module 206 for transmitting the radio signal, a battery voltage sensing part 208 for sensing a voltage of a battery 216, a pressure sensor 210 for sensing a pressure, a temperature sensor 212 for sensing a temperature, a drive detecting sensor 214 for sensing whether or not a vehicle is driving, and the battery (BAT) 216 for supplying a voltage.

As described above, the tire position information setting part 202, which is for assigning the tire position information in a manner corresponding to the position attached at the time of the first delivery, can be embodied to set manually by using a dual inline package (DIP) switch and the like, it may be embodied by an EEPROM and the like mounted in the microcomputer 204 and so is set preferably in a software-like manner.

The microcomputer 204 includes inside a CPU core, a memory, a real time clock (RTC), and a plurality of peripheral devices such as an analog input port, a digital input/output port, etc, and, as described hereinafter, e employs built-in software to control the whole operation of the transmitter 110. In addition, the microcomputer 204, which in a sleep mode is designed to perform only the minimum functions in order to minimize the consumption power (power saving), and thereafter, if a wake-up signal is applied to a wake-up terminal thereof, is switched to the wake-up mode to be awoken by the signal so that it can operate in the normal mode. At this time, the wake-up signal may be generated from the outside to be applied to the wake-up terminal of the microcomputer 204, but also it can be generated by using a time counter in the inside of the microcomputer 204. Furthermore, after the microcomputer 204 is awoken, a tire air pressure signal from the pressure sensor 210, a temperature signal of air inside the tire from the temperature sensor 212 and a drive velocity signal from the drive detecting sensor 214 are input to the microcomputer 204 so that the microcomputer 204 can judge the operation mode and then transit the detection data at fixed time period according to each operation mode. At this time, together with the pressure data, the temperature data, the battery voltage data and so forth, the tire position information is packetized in the fixed data format to be transmitted.

The radio transmission module 206 modulates a packetized digital bit stream into a radio frequency (RF) signal so as to transmit this through an antenna, wherein various modulation methods can be adopted. In one embodiment of the present invention, the radio transmission module 206 comprises a low-pass filter (LPF), a local oscillator, a mixer, an amplifier (AMP), a band-pass filter (BPF) and so forth, wherein in the low-pass filter, the digital bit steam is filtered into the double frequency of a transmitting base-band signal, thereafter this filtered signal is mixed in the mixer with a local oscillated signal from the local oscillator. This mixed signal is amplified in the amplifier and is filtered in the band-pass filter, and is transmitted into the F1 MHz band of public frequency. Because the inputted bit stream, being a digital signal, has a high-frequency component, it is not suitable for coupling directly with a carrier, so it is filtered by using the low-pass filter having a pass band of double digital bit stream's transmission ratio, and thereafter the filtered signal is modulated with the local oscillator signal.

The battery voltage sensing part 208 senses a voltage of the battery 216 to provide to the microcomputer 204, the pressure sensor 210 senses an air pressure P within the tire to provide to the microcomputer 204, and the temperature 212 senses an air temperature Temp to provide to the microcomputer 204. The optimal air pressure within the tires may have a different reference value according to different vehicles and tire types, but usually in case of an automobile it is about 28–32 psi (1 psi=0.0689 bar) or so. Upon driving, the air temperature and pressure within the tire tend to be increased more by a rolling resistance with the road surface and air friction than when the car is stopped or parked. The drive detecting sensor 214 senses the drive velocity of the vehicle to provide to the microcomputer 204. At this time, the signal sensed by each sensors 210, 212 and 214, being an analog signal, can be converted through the analog-digital converter ADC into the digital data to be provided to the microcomputer 204, and also, if the analog signal is inputted to an analog input port of the microcomputer 204, the microcomputer 204 can convert the inputted analog signal into the digital signal by using the analog-digital converter ADC to process this signal. Such sensing functions are designed to be compact by using the semiconductor devices made into an Application Specific Integrated Circuit (ASIC).

Figure 3:
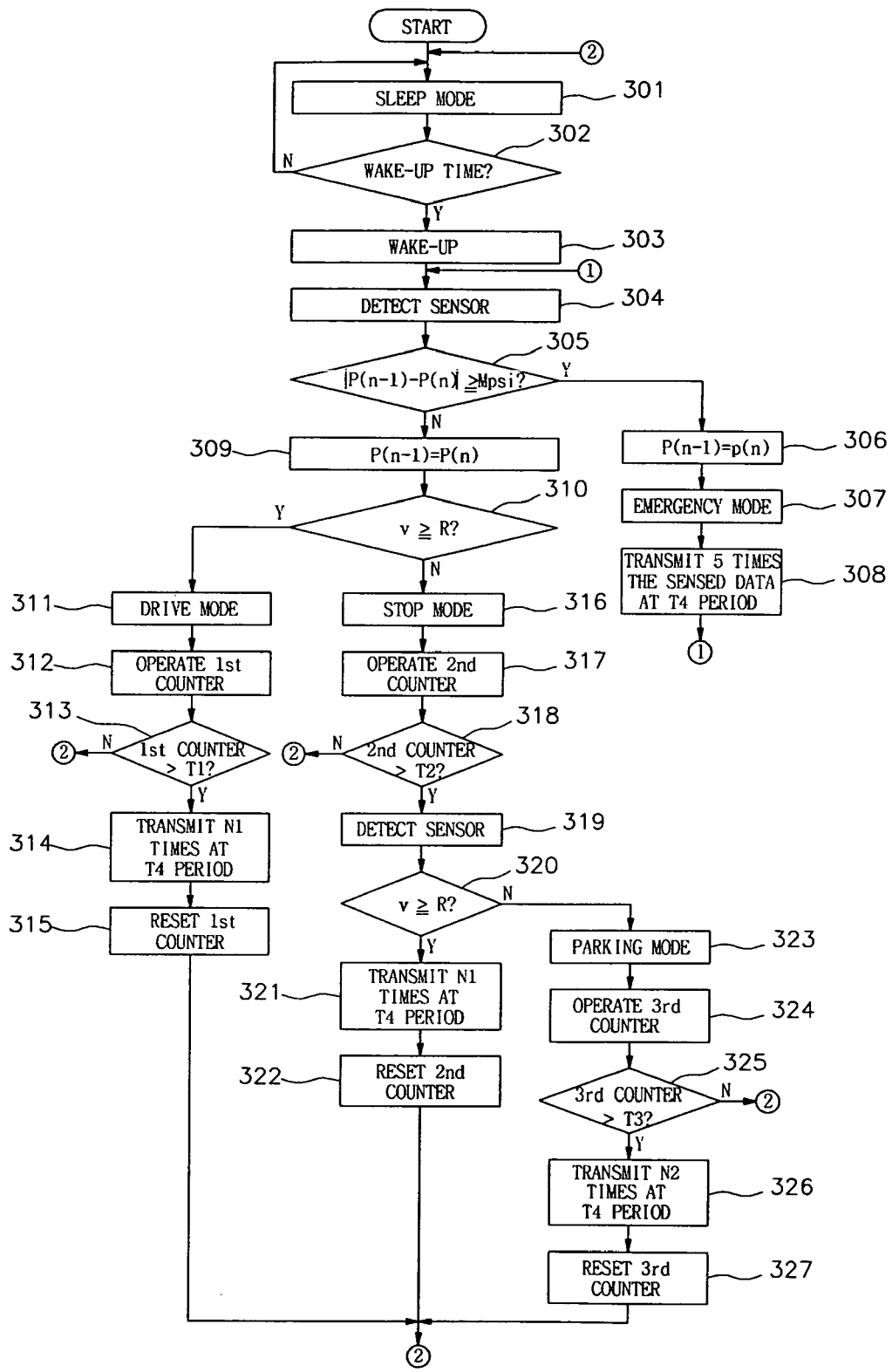
FIG. 3 is a flow chart showing an operation procedure of the transmitter illustrated in FIG. 2.

FIG. 3 shows a flow chart for explaining operation procure of the transmitter illustrated in FIG. 2.

The transmitter 110 operates in the sleep mode for minimizing the consumption power of the battery (step 301). The current consumed in the sleep mode is several $\mu A$ or so. The sleep mode is maintained until a predetermined wake-up time is reached (about 6 seconds in one embodiment of the present invention), the transmitter 110 operates in a sense mode for sensing various sensor values through the wake-up operation (steps 302 and 303). In the sense mode, the radio module 206 doesn't operate and only the minimum devices for sensing the tire condition are operated, therefore the consumption power is relatively small so that the life of the battery can be extended.

In the sense mode, the microcomputer 204 receives a battery voltage signal from a low voltage detecting sensor, the pressure signal from the pressure sensor 210, the temperature signal from the temperature sensor 212, and the drive velocity signal from the drive detecting sensor 214 to store at a present value position (step 304).

Subsequently, the microcomputer 204 compares a present pressure $P_n$ sensed at present time with a prior pressure $P_{n-1}$ sensed before this time. So if the difference between those absolute values is larger than M psi it updates the prior value into the present value ($P_n = P_{n-1}$), and operates in an emergency mode (steps 305–307). That is, if the difference between the prior pressure $P_{n-1}$ and the present pressure $P_n$ is M psi or more, it operates in the emergency mode for safe driving since the tire pressure may have been abnormally lowered by puncture or the like. In the emergency mode, the microcomputer 204 doesn't return to the sleep mode and continuously operates normally, so that it senses the tire condition data at more frequent periods than the prior detecting periods to repeatedly transmit, say 5 times more frequently, the sensed data at a period, $t_4$ (step 308).

Comparing the present pressure $P_n$ with the prior pressure $P_{n-1}$, if the difference between those absolute values is less than M psi, the microcomputer 204 updates the prior value to the present value (step 309). Subsequently, it checks whether or not the present velocity V is more than a predetermined speed value R. As a result, if the result is checked as the value more than R, it operates in the drive mode (steps 310 and 311). If the result is checked as less than R, operations go into a stop mode (step 316). After a predetermined time has passed in the stop mode, the velocity value is sensed again. When the present velocity value has been compared with the reference value, if the present velocity value is continuously less than the value R, it operations go into a parking mode (steps 320 and 323). Thus, by checking the operation mode in response to the tire pressure P and the tire velocity V, the microcomputer 204 transmits intermittently the tire condition data in the parking/stop modes which has a relatively low danger of accident, and transmits relatively frequently the tire condition data in the drive mode which has a relatively high danger of accident, and thereby transmits in several second intervals, the tire condition data in when an emergency is more likely, so that a driver can take proper precautions.

In the drive mode, which is a condition the vehicle is driving normally, a $1^{st}$ counter is operated to begin counting. If the $1^{st}$ counter time is $t_1$ minutes, the tire condition data is repeatedly transmitted $N_1$ times at a $t_4$ msec period, and thereafter the $1^{st}$ counter is reset (steps 311–315). Thus, when the microcomputer 204 transmits the tire condition data, by transmitting many times repeatedly at fixed time intervals, erroneous transmission can be prevented, and although a plurality of transmitters simultaneously transmit the data to one receiver, the receiver can receive the data without any interference.

In the stop mode, if the $2^{nd}$ counter time has passed $t_2$ minutes, the $2^{nd}$ counter receives again the velocity value from the drive detecting sensor 214. If the velocity V is a value more than R, the tire condition data is transmitted $N_1$ times at $t_4$ msec period, and thereafter the $2^{nd}$ counter is reset (steps 316–322).

After $t_2$ minutes in the stop mode, if the velocity V is continuously less than R (e.g., V=rest), it operates in the paring mode. In the parking mode the $3^{rd}$ counter is operated to count the time, and if the $3^{rd}$ counter time equals $t_3$, the tire condition data is transmitted $N_2$ times at the $t_4$ msec period, and thereafter the $3^{rd}$ counter is reset (steps 323–327).

Figure 4:
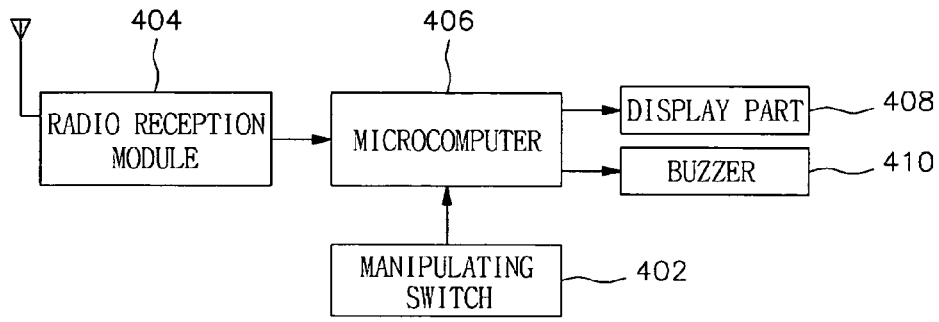
FIG. 4 is a block diagram showing a construction of a tire condition receiver illustrated in FIG. 1.

FIG. 4 is a block diagram showing a construction of a tire condition receiver illustrated in FIG. 1.

Referring FIG. 4, the tire condition receiver 120 comprises a manipulating switch 402 which is manipulated for controlling the present tire status monitoring system by a driver, a radio reception module 404 for receiving the high-frequency radio signal, a microcomputer 406, a display part 408, and a buzzer 410, and thereby receives the tire condition data from 4 tire condition transmitters 110 display the result to a driver.

If the radio reception module 404 receives a radio signal of F1 MHz band through the antenna, it demodulates the received signal to output a digital bit stream. The microcomputer 406 decodes the inputted bit stream from the radio reception module 404, and sorts respectively the tire condition data by each tire position to store this data. As described hereinafter, various warning reference values are set according to the manipulation and/or preference of a user, and the received tire condition data is compared with a predetermined warning reference value to vibrate the buzzer 410 or display on the display part 408.

Figure 5:
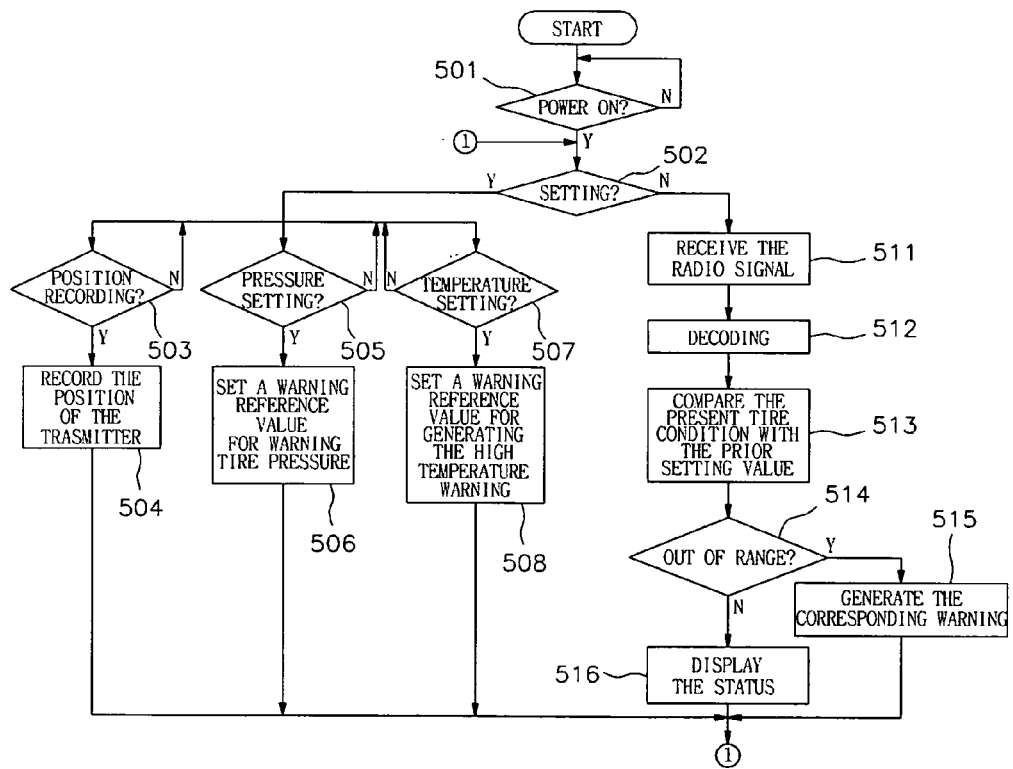
FIG. 5 is a flow chart showing an operation procedure of the receiver shown in FIG. 4.

FIG. 5 shows a flow chart for explaining an operation procedure of the receiver illustrated in FIG. 4.

Referring to FIG. 5, if a driver turns on a vehicle by a starting key, the electric power is supplied, so that the receiver begins to operate. If the driver presses a setting key for setting the various warning reference values or recording positions, the corresponding function is processed (steps 501 and 502). Usually, such setting is performed once on first installation, the position recording is performed only in case the tire position is changed.

In the setting mode, if a user selects "position recording", the position of the changed tire condition transmitter is connected and recorded (steps 503 and 504). If a user selects "pressure setting", a warning reference value for warming of tire pressure changes is set (steps 505 and 506). According to the condition of the tire pressure, the tire pressure warning is classified into an "attention warning" for calling a driver's attention, a "minor warning" which is stronger than the "attention warning" and a "major warning" which is needed for any emergency measures. It is preferred to set the warning reference values for various stages. For example, the in case the optimal tire pressure is 28 to 32 psi, the tire pressure warning is set to generate the attention warning at tire pressure of 26 to 28 psi, the minor warning at 25 psi and the major warning at tire pressure less than 25 psi.

In addition, if the user selects "temperature setting" in the setting mode, the warning reference value for generating the high temperature warning according to an increase of temperature is set (steps 507 and 508).

After the setting is finished, in normal mode, the radio signal is received from each transmitter 110, to be demodulated into bit stream (packet). Then, this is decoded so that the present tire condition value is compared with the prior setting value (steps 511–513). At this time, because the four tire condition data are received from four tires, each condition data is compared with the warning reference value, so that if even one of the conditions reaches the warning reference value, the warning is generated.

As a result of comparison, if the present tire condition data is out of normal range relative to the warning reference value, the corresponding warning is generated. If the value is normal value, it is displayed by as a graphic or numerical value on an LCD screen so that the driver can recognize the present tire condition (steps 514–516). For instance, the minor warning is generated if the present tire pressure is 25.5 psi, and the major warning is generated if the present tire pressure is 23 psi. Then, in the attention warning, the warning is displayed without a buzzer sound, and in the minor warning, a buzzer sound is intermittently generated as well as a yellow LED can be flashed or displayed.

Figure 6:
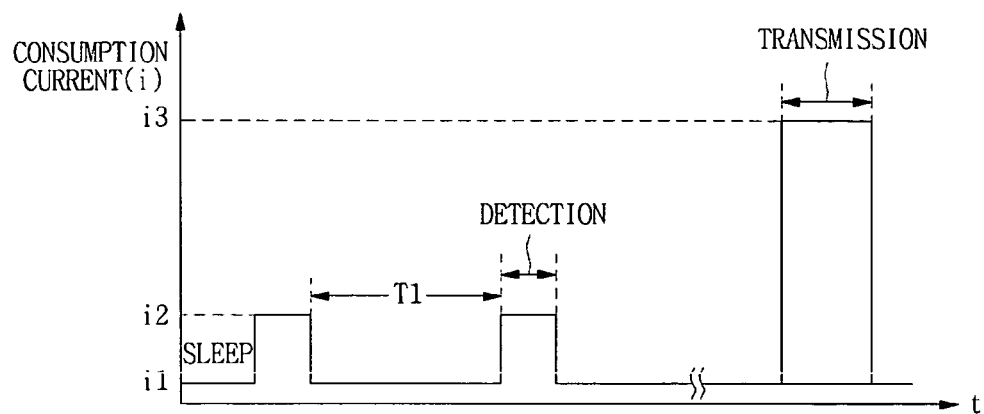
FIG. 6 is a graph showing consumption power according to operation of the transmitter of the present invention.
Figure 7:
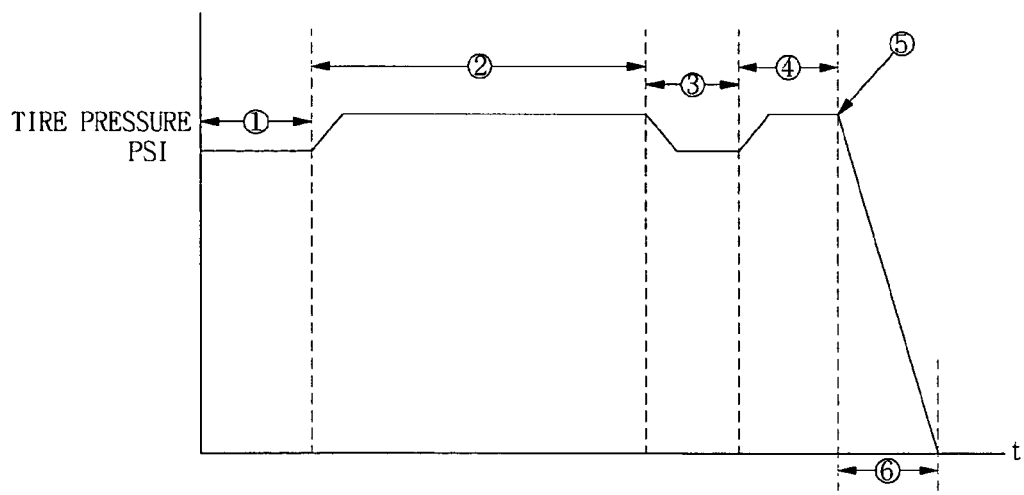
FIG. 7 is an exemplary graph showing change of tire pressure according to operation mode of the present invention.

FIG. 6 is a graph showing consumption power according to operation of the transmitter of the present invention, and FIG. 7 is an example of a graph showing change of tire pressure according to an operating mode of the present invention.

In the graph of FIG. 6, the horizontal axis is a time (t) axis and the axis of ordinate represents a magnitude of consumption current (i). According to the graph shown, it can be understood that in the sleep mode the consumption current is very low as several $\mu A$ ($i_1$) and in the sense mode, which is awoken to sense the tire condition, the larger current ($i_2$) is consumed. Also, it can be understood that, in the transmission mode, the relatively larger current ($i_3$) is consumed. Accordingly, the present invention is designed to detect the tire pressure P and the velocity in the sense mode and recognize the operation mode so that, in the parking and stop modes which are relatively safe, the sensed data is intermittently transmitted to reduce the consumption power, and in the drive mode or emergency it is frequently transmitted to guarantee safety. In FIG. 6, T1 is a sensing period, and it is about 6 seconds in one embodiment of the present invention.

In the graph of FIG. 7, the horizontal axis is a time (t) axis and the axis of ordinates represents the tire pressure (PSI). In the graph shown, ① designates a parking mode period when the vehicle has been parked, ② a drive mode period when the vehicle has been driven, ③ a stop mode period when the vehicle has been stopped temporarily on the way of driving, and ④ a drive mode period when the vehicle has been driven again. In case the tire is punctured (⑤), it can be seen that the tire pressure is rapidly reduced, and the section where the tire pressure is rapidly reduced thus represents an emergency mode period (⑥). According to the graph shown in FIG. 7, it can be understood that although the tire pressure is increased in some degree during driving, it is lowered again during parking.

Hereinafter, the operation of the tire status monitoring system constructed as the above according to the present invention will be explained in detail.

Firstly, in an embodiment of the present invention, an operation mode and the transmission period according thereto are illustratively defined in the following Table 2.

TABLE 2

| Operation mode | Condition | Sense period | Transmission period | Transmission method |
| --- | --- | --- | --- | --- |
| Drive mode | $\|P_{n-1} - P_n\| <$ Mpsi $\geq$ R | 6 seconds | $t_1$ minutes | transmits $N_1$ times at $t_4$ ms period |
| Stop mode | $\|P_{n-1} - P_n\| <$ Mpsi V < R | 6 seconds | $t_2$ minutes | transmits $N_1$ times at $t_4$ ms period |
| Parking mode | $\|P_{n-1} - P_n\| <$ Mpsi V < R continuing for $t_2$ minutes | 6 seconds | $t_3$ times | transmits $N_2$ times at $t_4$ ms period |
| Emergency mode | $\|P_{n-1} - P_n\| \geq$ Mpsi | 3 seconds | 3 seconds | transmits $N_1$ times at $t_4$ ms period |

Referring to Table 2, the transmitter according to the present invention is awoken after 6 seconds to sense tire pressure, temperature, velocity and battery voltage which designate a tire condition, and the transmitter compares the present pressure $P_n$ with the prior pressure $P_{n-1}$, so that, if the difference between those is more than M psi, it is defined as an emergency mode, and if the difference is less than M psi. The operation mode is classified into drive mode, stop mode and parking mode according to the velocity. The drive mode is in a case where the velocity V is more than R, and is in the condition that the vehicle is driven. The stop mode is in a case where the velocity is less than R, and the parking mode is in a case where the velocity V is equal to or less than R (i.e., stop mode) continuously for a fixed time (for example, $t_2$ minutes). The transmission operation occurs after a period of approximately $t_1$ minutes in the drive mode, at a period of about $t_2$ minutes in the stop mode, the transmission operation occurs, and at a period of about $t_3$ times in the parking mode. In the emergency mode, the transmitter receives the tire condition information at a period of about 3 seconds, to transmit the received information each time. Such transmission periods are only examples and, if necessary, can be predetermined and applied as needed or desired.

The tire condition transmitter 110 is awoken after 6 seconds to detect the tire pressure, the temperature, the velocity, the battery voltage, etc. which represent the tire conditions, so that it can compares the present tire pressure with the prior pressure as well as comparing the velocity with the setting value, thereby recognizing the operation mode. According to the recognized operation mode, the detected data is transmitted at a fixed period set as in the above Table 2.

The tire condition receiver 120 initiates operation when the starting key is turned on, and receives the radio signal from the tire condition transmitter 110, so that it can demodulate the received radio signal to reproduce the tire condition data. When it has compared the tire condition data with various predetermined waning reference values, and the result is out of normal value range of the warning reference value, a warning is generated to call a driver's attention. Further, if the result is normal, the tire condition is displayed on a display so that the driver can see the tire condition.

As explained above, the tire status monitoring system according to an embodiment of the present invention has advantages in that the radio transmitter being attached to the tire wheel detects the tire condition and then transmits wirelessly the information of tire pressure, temperature, battery voltage, etc., and the radio receiver mounted on the dashboard within the vehicle displays the received information from each tire condition transmitter on a screen. The received values are compared with the predetermined waning reference value, thereby generating a warning in case the received value is out of the reference value range, so as to promote safety during driving. Moreover, the present invention, in order to reduce the consumption of the battery for the tire condition transmitter, the tire condition information transmitter is designed to judge the tire pressure and the velocity values detected in the sense mode, recognize the operation mode, thereby transmitting more frequently in the drive mode or in the emergency mode and transmitting more intermittently in the parking and stop mode in accordance with the recognized operation mode, thereby increasing a life of the battery together with a promoting safer driving conditions.

Furthermore, by using the tire status monitoring system according to the present invention, the following effects can be obtained: one direct effect includes the decrease in loss of lives by reduction of automobile accidents, as well as indirect effects of reduction of fuel by maintaining a fixed level of air pressure, a life extension of the tire, a reduction of a exhaust gas exhausted during vehicle being drive, etc.

While the tire status monitoring system according to the present invention has been explained and shown above as only an exemplary preferred embodiment it is intended that the present invention is not limited to the foregoing embodiment but those skilled in the art can make various modifications and variations without departing from the principle of the invention as defined in the appended claims.

What is claimed:

1. A tire status monitoring system comprising:
   a plurality of transmitters, mounted within the tires of vehicle, for transmitting tire condition data after detecting the tire condition; and
   a receiver, installed in the vehicle, for analyzing the tire condition data received from each transmitter, thereby displaying the tire condition; wherein
   the transmitter comprises;
   a pressure sensor for sensing an air pressure in the tire to provide pressure data; a temperature sensor for sensing an air temperature in the tire to provide temperature data;
   a drive detecting sensor for sensing whether the vehicle is driven or not to provide driving velocity data;
   a radio transmission module for modulating the input data into a radio frequency signal to transmit the modulated signal; and
   a control means for identifying the operation mode by the pressure data, the temperature data and the driving velocity data inputted from the sensors in sensing mode and controlling the radio transmission module so that the sensed data can be transmitted at a predetermined period according to the identified operation mode.

2. A tire status monitoring system according to claim 1, wherein the transmitter includes a battery voltage detection means for detecting a batty voltage, and the control means formalizes the detected voltage together with the other detected data into a packet of a predetermined format.

3. A tire status monitoring system according to claim 1, wherein the operation mode is classified into an emergency mode, a drive mode, a stop mode and a parking mode according to, when the present tire pressure has been compared with one of the prior tire pressure, the resultant difference and the present velocity.

4. A tire status monitoring system according to claim 3, wherein the emergency mode is the case where the difference between the present pressure and the prior pressure is more than a predetermined value,
   the drive mode is the case where the difference between a present pressure and a prior pressure is less that a predetermined value and the velocity is more than a predetermined setting value,
   the stop mode is the case where the difference between the present pressure and the prior pressure is less than the predetermined value and the velocity is equal to or more than the predetermined setting value, and
   the parking mode is the case where the stop mode is maintained for a predetermined time.

5. A tire status monitoring system according to claim 1, wherein the transmitter further includes a tire position setting means, thereby transmitting characteristic tire position information capable of recognizing the tire position.

6. A tire status monitoring system according to claim 5, wherein the tire position is determined as attached position according to a remainder value after being divided by 4.

7. A tire status monitoring system according to claim 1, wherein the receiver comprises:
   a manipulating means;
   a radio reception module for receiving a radio signal to demodulate received signals;
   a display;
   a buzzer; and
   a control means for setting a warning reference value for a warning, such that a driver selects the setting, and controlling, in a normal state, the condition data of each tire through the radio reception module and decoding the received data, and thereafter comparing the decoded data with the predetermined warning reference value so that a warning can be generated by vibrating the buzzer or displaying the tire condition on the display.

8. A tire status monitoring system according to claim 7, wherein the receiver classifies the warning into an attention waning, a minor warning and a major warning in accordance with the tire pressure, to inform the driver.

* * * * *